United States Patent
Manmatha et al.

(10) Patent No.: US 10,528,819 B1
(45) Date of Patent: Jan. 7, 2020

(54) COMPRESSED CONTENT OBJECT AND ACTION DETECTION

(71) Applicant: A9.com, Inc., Palo Alto, CA (US)

(72) Inventors: R. Manmatha, San Francisco, CA (US); Hexiang Hu, Los Angeles, CA (US); Deva Ramanan, Palo Alto, CA (US)

(73) Assignee: A9.COM, INC., Palo Alto, CA (US)

( * ) Notice: Subject to any disclaimer, the term of this patent is extended or adjusted under 35 U.S.C. 154(b) by 234 days.

(21) Appl. No.: 15/818,390

(22) Filed: Nov. 20, 2017

(51) Int. Cl.
  *G06K 9/00* (2006.01)
  *G06K 9/62* (2006.01)

(52) U.S. Cl.
  CPC ..... *G06K 9/00718* (2013.01); *G06K 9/00744* (2013.01); *G06K 9/6262* (2013.01); *G06K 2009/00738* (2013.01)

(58) Field of Classification Search
  CPC ............. H04N 19/159; G06K 9/00744; G06K 9/00718; G06K 9/6262; G06K 2009/00738
  USPC ......................................... 382/156, 232, 233
  See application file for complete search history.

(56) References Cited

U.S. PATENT DOCUMENTS

| | | | |
|---|---|---|---|
| 10,347,293 B1 * | 7/2019 | Skinner | G06K 9/00718 |
| 2008/0310734 A1 * | 12/2008 | Ahammad | G06K 9/00711 382/209 |
| 2018/0268222 A1 * | 9/2018 | Sohn | G06K 9/66 |
| 2019/0251360 A1 * | 8/2019 | Cricri | G06K 9/00664 |

* cited by examiner

*Primary Examiner* — Daniel G Mariam
(74) *Attorney, Agent, or Firm* — Hogan Lovells US, LLP

(57) ABSTRACT

Various embodiments of a framework which allow, as an alternative to resource-taxing decompression, efficient computation of feature maps using a compressed content data subset, such as video, by exploiting the motion information, such as a motion vector, present in the compressed video. This framework allows frame-specific object recognition and action detection algorithms to be applied to compressed video and other media files by executing only on I-frames in a Group of Pictures and linearly interpolating the results. Training and machine learning increases recognition accuracy. Yielding significant computational gains, this approach accelerates frame-wise feature extraction I-frame/P-frame/P-frame videos as well as I-frame/P-frame/B-frame videos. The present techniques may also be used for segmentation to identify and label respective regions for objects in a video.

20 Claims, 6 Drawing Sheets

COMPRESSED CONTENT OBJECT AND ACTION DETECTION

BACKGROUND

Detection and understanding of objects, actions, events, and segments in digital videos are significant problems in, and desired functionalities for, computer vision. For example, video understanding may be needed in order to detect certain objects, actions, events, and segments in television broadcasts, motion pictures, videos shared via social media, and surveillance videos. Such detection may even improve an X-ray or a magnetic resonance imaging (MRI) scan feature, or perhaps to provide new computer vision services for a cloud services provider. Additionally, some tasks such as object detection and action recognition may potentially be run on resource-constrained devices such as smartphones, tablets, or even Internet of Things (IoT) devices such as security cameras.

As video files tend to be sizeable, the use of heavily compressed files is in favor. However, most modern vision algorithms require decompressing the video and processing the uncompressed video frame-by-frame. This is expensive in terms of computation, memory and storage. By way of example, Faster R-CNN (Regional Convolutional Neural Network), an object detection algorithm well known in the art, runs at 5 FPS (frames per second) on 720p videos in one case (but will vary as a function of processor speed), so vision processing, via that algorithm, for one hour of a video requires approximately five hours of computing time. This makes it impractical, or at least computationally expensive, to run such high-accuracy algorithms on devices such as smartphones and small cameras (e.g., security cameras), or to do real-time vision tasks on such storage and computationally-constrained devices. Video frames being redundant in large part, other approaches attempt to sample the frames every so often and skip others, but such approaches remain relatively slow and can introduce errors in the form of missed objects.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to detecting objects and recognizing actions in compressed media content such as video for content searching, indexing, or other such uses. Disclosed is a framework for applying computer vision algorithms to compressed media content such as videos for object or event detection. In particular, various embodiments provide faster, more efficient detection algorithms, while retaining frame-specific accuracy, by directly using the compressed media and machine learning to detect objects in each video frame. Common compression standards such as MPEG, H.264, or H.265 compress videos using a group of pictures (GoP) format. In each GoP, there is an I-frame (Intracoded picture), which is a complete frame containing all of the information required to recreate that video frame. The next frame is a P-frame (Predictive picture). P-frames are obtained by computing the block motion field between the previous frame and the current frame and then storing both the block motion field and the residual between the prediction and the actual frame in the P-frame. A third type of compressed frame, a B-frame (Bidirectional picture) contains the residual motion vectors from both preceding and following I or P frames. Given the resource-intensive nature of running a complete, frame-by-frame vision analysis, the heavy-duty feature extraction and computation is thereby only performed on a sparse set of complete frames (the I-frames, which are detailed below) and then propagating them using the more-limited motion information stored in the other, partial-type frames (the P-frames and B-frames, also discussed in detail herein). Among other settings, this will benefit high-volume video collections, such as closed-circuit surveillance video, and power-constrained video devices, such as smartphones, tablets, and laptop computers.

Figure 1A:
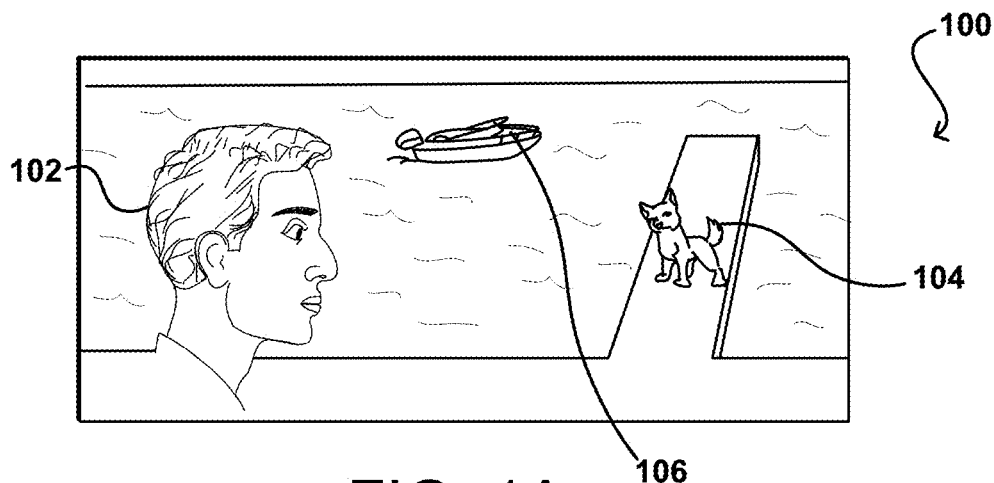
FIGS. 1A and 1B illustrate, respectively, media content including a set of objects and an example process for detecting objects in compressed media content in accordance with various embodiments.

FIG. 1A illustrates an example video frame 100 displayed using data contained in a compressed media content file. As illustrated, there can be various objects or features represented in the data, such as a man 102, a dog 104, and a boat 106, among other objects. For various reasons, such as for content searching or indexing, it can be desirable to identify objects represented in a media file. In addition to types of objects, other information can potentially be determined as well. This can include, for example, the identity of the man 102 as a famous actor, a breed of the dog 104, or a type or model of the boat 106. Various approaches such as object recognition and computer vision can be used to identify such objects represented in the compressed media content.

Contrary to prior efforts requiring the use of uncompressed video, the present methods and systems directly process compressed videos and use a feature map and optionally a motion vector from the compressed video to perform specific tasks such as object detection. Many existing computer vision algorithms are run on sub-sampled frames, to reduce computation. Rather than sub-sampling frames, existing computer vision algorithms are better served, as contemplated herein, by performing the feature computation using a heavy duty deep network on the I-frames and then using the motion field derived from the compressed video to interpolate the features for other frames such as P frames. The specific object or action detection is then done using a small neural network over the computed features. Using this approach such algorithms can achieve significant computational gains. For example, on average, this approach can be ten times (10×) faster than using a framewise algorithm on uncompressed video, with only a three percent (3%) drop in accuracy. Using a highly compressed video format (including I-frames, P-frames, and B-frames) can be up to one hundred times (100×) faster in feature extraction, although at the cost of reduced accuracy when operating at extreme speeds and wider sampling ranges.

With the emergence of the deep convolutional neural network (CNN), a programming and information processing paradigm allowing a machine to learn from data, object detection performance has improved significantly. Well known in the art, a CNN was first proposed to use a convolutional network as a visual classifier for proposals of objects that may be in media content. With a CNN, the process starts with processing an image (such as a 7×7 network output with vectors) and, as processing moves along, the image area being analyzed gets smaller. More recently in the art, several algorithms take a further step toward single-stage object detection, without using object proposals, achieving some success in better computation efficiency and competitive detection performance. Still, a two-stage object detection framework integrates the object proposal stage into a CNN and trains the processing pipeline, end-to-end, obtaining state-of-the-art performance.

Applying a variant of two-stage object detection algorithms, the subject methods and systems are designed such that both one-stage/two-stage object detection algorithms can be applied to it. And it should be noted that the term "frames" is to be interpreted broadly and include any sort of divisions of live or stored compressed media content. While the present disclosure references certain video compression formats, such as MPEG-4 and H.264, this is also by no means limiting, and the features of the methods and systems herein may be applied to any number of applications and digital media compression formats, including that for audio and finding events therein.

The MRI environment, where video is being used as an upgrade to the traditional static imagery, is one of potential applicability, as are radar and seismograph tracking efforts. Additionally, the techniques herein may certainly be applied to live video and to detect actions and events, rather than recognize objects, and may be used for segmentation to identify, map, and label respective regions for objects in a video. The action and event detection will assist in any number of situations, but certainly including security and surveillance, where queries could be run to identify actions such as briefcase transfers or physical violence. And such segmentation could be applied in the autonomous vehicle setting, where the vehicles will certainly want to identify objects in front of them, such as other vehicles or people, as well as segmenting roads from other spaces. In such other uses, the neural network employed will likely need tweaking and/or additional or alternative elements to fit the specifics of the particular situations. As known in the object-oriented and other computer science arts, the action detection, event detection, and segmentation features may be accomplished through the use of separate software modules executing on top of the feature map. Accordingly, to the extent the present disclosure or the invention as claimed references "objects," such should be construed to also include at least action and event detection and video segmentation.

Video Compression: Groups of Pictures; Frame Types; and Motion Vectors.

A GoP consists of a group or plurality of successive or adjacent video frames to be encoded. It is the minimum, non-dependent decoding unit in a video stream that a decoder can decode without requiring other information not contained in the given GoP. As noted, a GoP contains three types of frames well known to those in the industry: the I-frame, the P-frame, and the B-frame. The I-, P-, and B-frames are the major picture types used in video compression algorithms, and, in accordance with the illustrative process flows in FIGS. 1B through 3, a GoP must have at least one I-frame 300 and one or more P-frames 310, and zero or more B-frames.

The starting point for modern video compression is the I-frame (Intracoded picture) 300, which is a complete image and considered the "key frame" for present purposes. I-frames 300 are the least compressible type of frames and most expensive in terms of resource use, but they do not require the use of other video frames in order to be decoded. P-frames 310 and B-frames 310, on the other hand, are partial frames and hold only part of the image information (namely, the part that changes between frames), so they need less space in the output file than an I-frame 300.

A P-frame (Predictive picture) 310 holds only the changes in the image from the previous frame, uses data from previous frames for decompression, and are thus more compressible than I-frames 300. Using a designated block or bounding box, a P-frame 310 stores motion vectors and residuals, not the actual image, based on how the block or box has moved when compared to the prior I-frame 300 or the prior P-frame 310. So it is not possible to reconstruct a frame, using a P-frame 310 alone.

More specifically, applying the motion vector 350 to data from a key I-frame 300 yields an estimate of how the contents of a given P-frame 310 or B-frame 310 should appear, but this estimate can be errant, as only block movement is computed, not the movement of every pixel in a frame. In addition, new elements not in the previous I-frame 300 may be introduced in the video. The difference between the estimated P-frame 310 or B-frame 310 and the actual frame contents 320 is termed the residuals. Mathematically, $mv_{k,k+1}$ represents the movements of macro blocks from the source frame indexed k to the target frame indexed k+1 (here in this example, the source frame may be either an I-frame 300 or a P-frame 310). The variable $res_{k+1}$ represents the difference between the true P-frame 310 to the motion predicted P-frame 310 $P_{k+1}$:

$$\hat{P}_{k+1}:(rgb(P_{k+1})-rgb(\hat{P}_{k+1})).$$

Frequently, encoders will sequence a GoP as an I-frame 300 followed by multiple P-frames 310 (I-frame, P-frame, P-frame, and so on), with an I-frame 300 appearing periodically, such as every twelve frames, in the interest of accuracy as well as to ensure recovery from a break in transmission (as such recovery cannot be made from only a P-frame 310).

B-frames (Bidirectional pictures) 310 are another, even more efficient, compression option and use differences between the current frame and both the preceding and following frames to specify their content. Using both previous and forward frames for data reference saves even more space than P-frames 310 and allows the highest amount of data compression. However, B-frames 310 require more computation, making for a compression efficiency trade-off. A B-frame 310 may be viewed as a special type of P-frame 310, where motion vectors are computed bi-directionally between the B-frame 310 and a P-frame 310 or I-frame 300. Compression can be even more efficient with B-frames 310, on the order of, for example, using I-frames 300 only once every three hundred frames or so in a representative GoP. To decode a B-frame 310 $B_{k+2}$, $mv_{k+1,k+2}$, $mv_{k+3,k+2}$ and residual $res_{k+2}$ should be used, in a manner similar to P-frame 310 decoding.

Using the first P-frame 310 in a GoP as example, the specifics of an illustrative decoding process are:

$$rgb(P_{k+1})=T_{motion}(rgb(I_k,mv_{k,k+1})+res(p_{k+1})$$

$T_{motion}$ maps macro blocks from the source frame $I_k$ to the target frame $P_{k+1}$ using the motion vector $mv_{k,k+1}$. The residual $res_{k+1}$ between the true P-frame 310 and the motion-compensated P-frame 310 is added back to complete the procedure. Similarly, for B-frame decoding (assuming k+3 is a P-frame 310):

$$rgb(B_{k+2}) = T_{motion}(rgb(P_{k+1}), mv_{k+1,k+2}) + T_{motion}(rgb(P_{k+3}), mv_{k+3,k+2}) + res(B_{k+2})$$

Detection of Objects and Events/Actions in Compressed Video

Figure 1B:
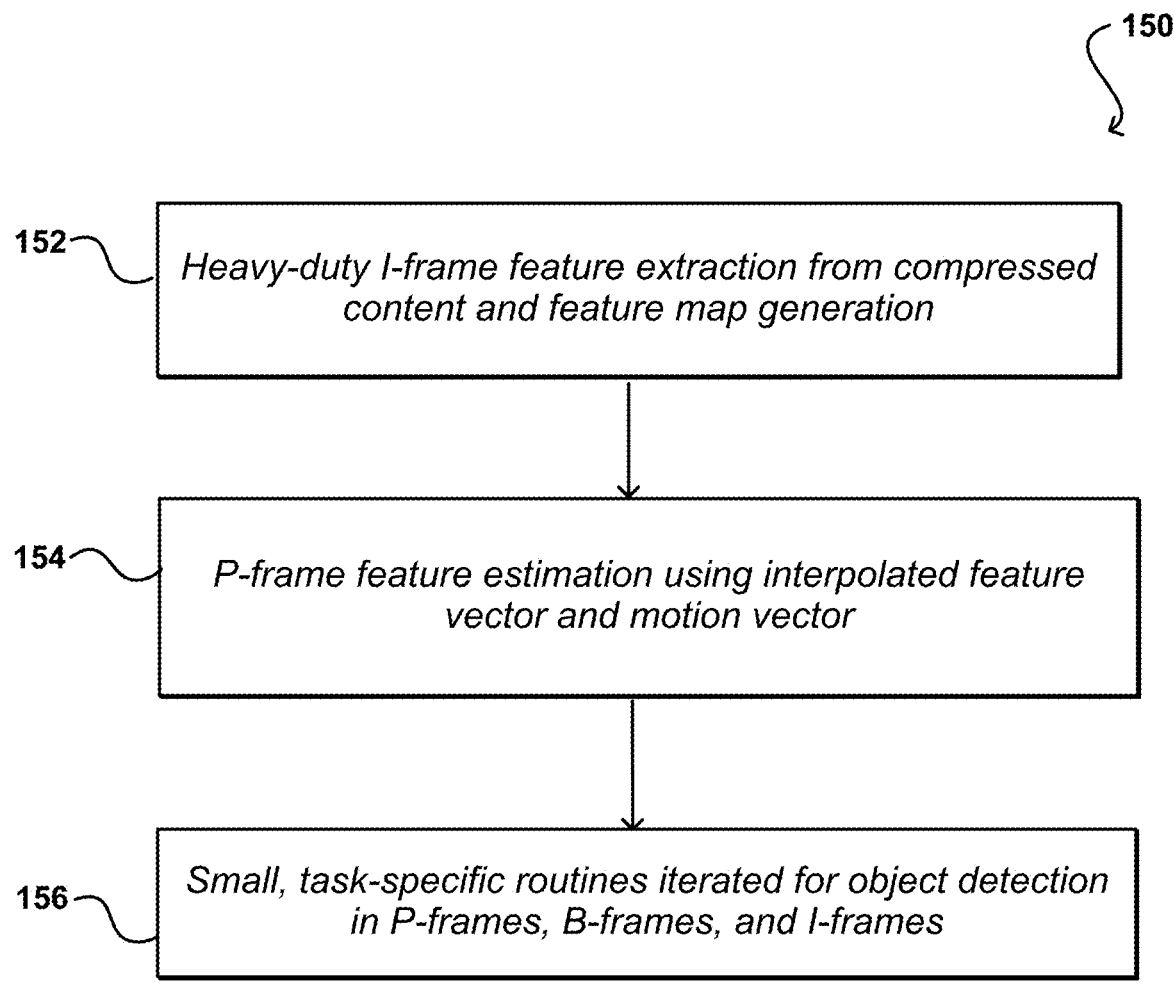
Figure 2:
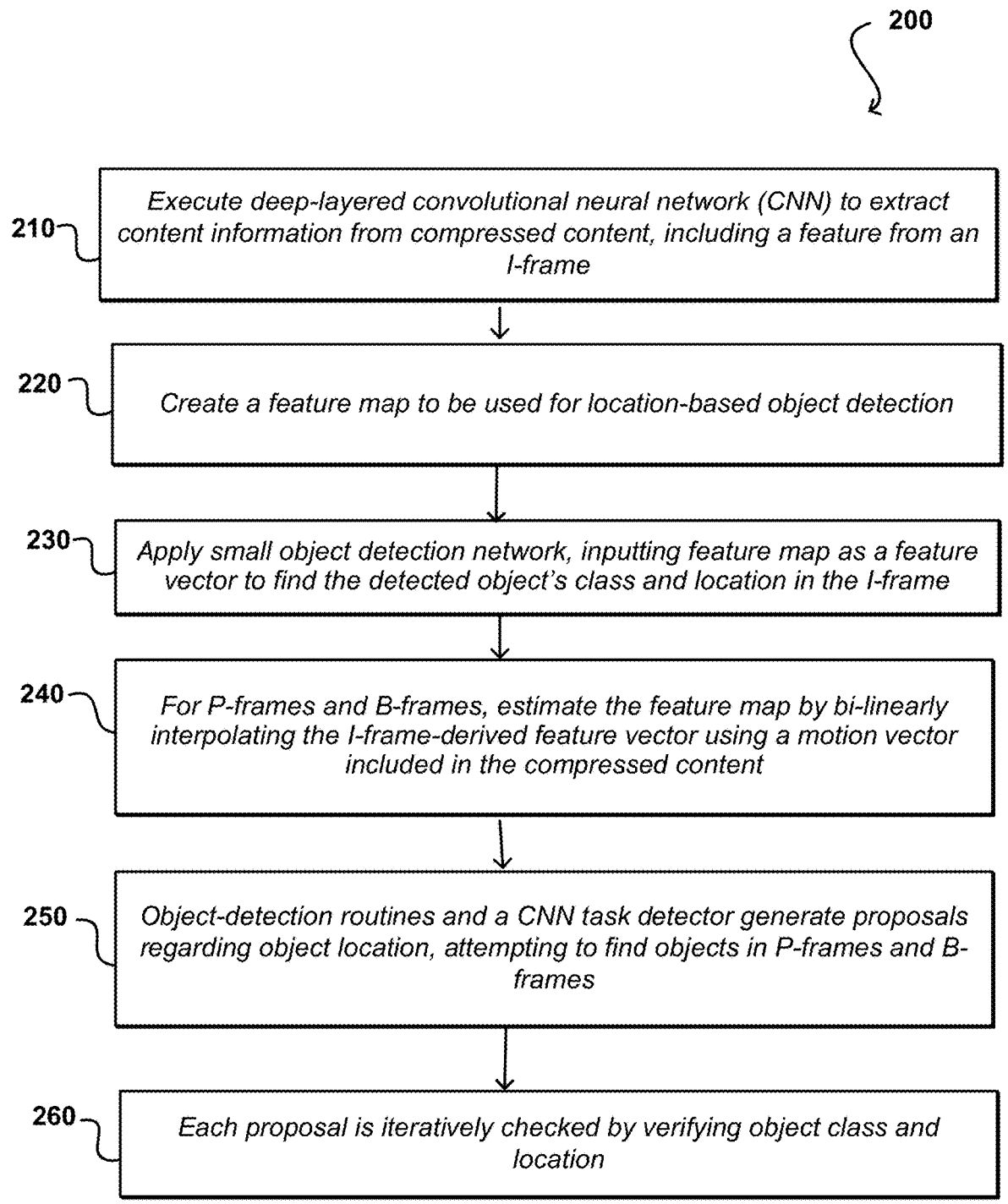
FIG. 2 is illustrates another example process for detecting objects in compressed media content in accordance with various embodiments.

As may be seen in particular in FIGS. 1B and 2, efficiently running vision algorithms on compressed video pursuant to illustrative embodiments 150 and 200, respectively, of the present computer-implemented systems and methods, and thereby speeding up object detection therein, entails at least the following three principles: (1) I-frame feature extraction and feature map generation (steps 152, 210, and 220); (2) P-frame feature estimation (steps 154, 230, and 240); and (3) iterative detection of objects, including events or actions, in one or more P-frames, B-frames, and I-frames (steps 156, 250, and 260). This stands in contrast to the prior method requiring content that is decompressed and full frame-by-frame analysis.

1. Heavy-Duty I-Frame Feature Extraction into a Feature Map.

Figure 3:
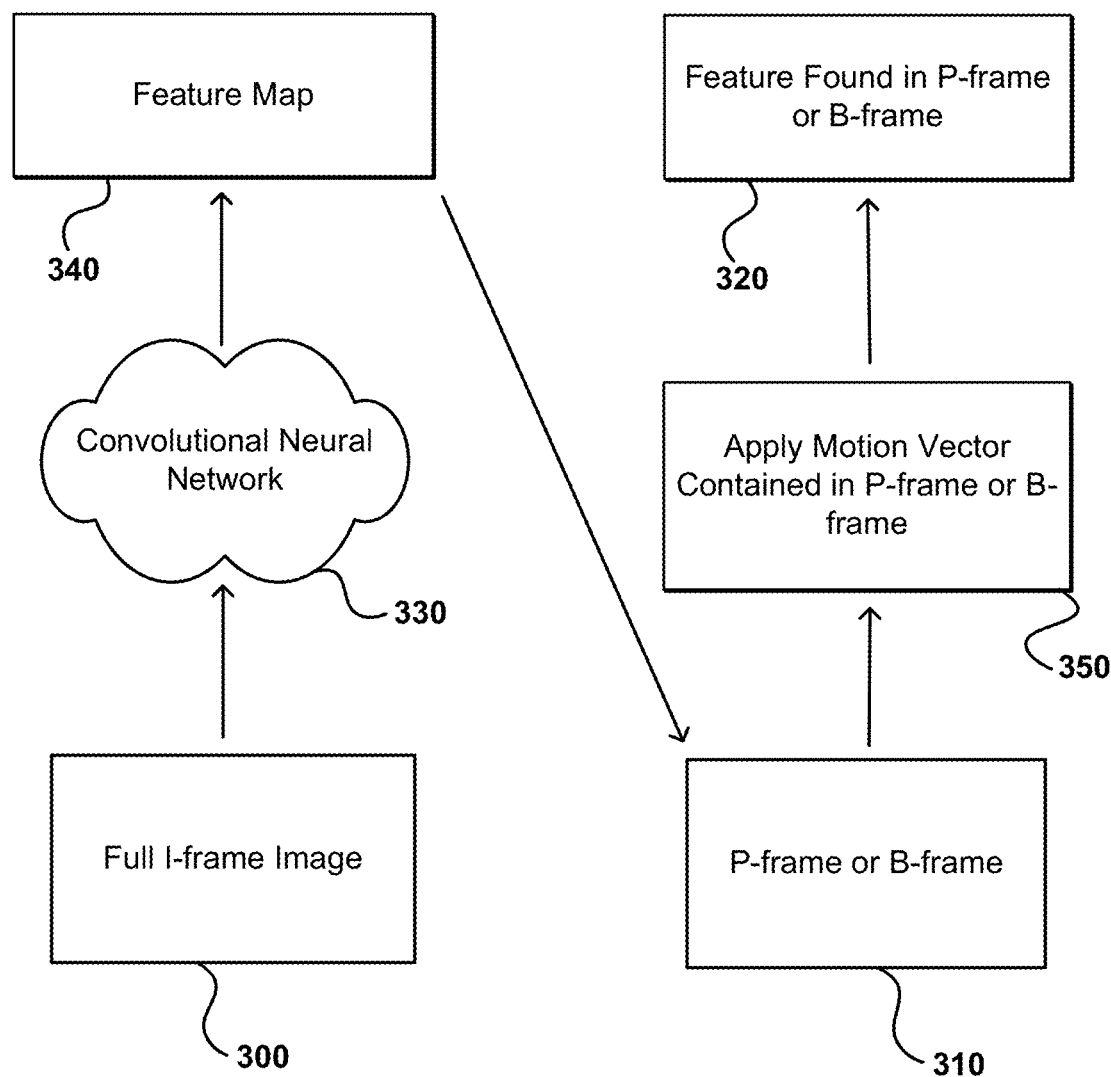
FIG. 3 illustrates a representative frame-level process for two-stage object detection in accordance with various embodiments.

As noted, and referenced in FIG. 3, an I-frame 300 contains all of the information needed to reconstruct the frame. A CNN 330, which is a heavy-duty, deeply-layered network (such as a Resnet-50) standard in the video recognition and analysis field, may be built and executed to extract content information in the form of a feature from an I-frame 300 and then create a feature map 340 used for location-based object detection. A small object detection network is subsequently applied, inputting the feature map 340 as a feature vector in order to find 320 the class or classification of the extracted feature (a car, airplane, chair, etc.) and its location in the image. Such class determination may be made with this assistance of, and comparison to, a database of possible feature classes.

2. P-Frame or B-Frame Feature Estimation Using Motion.

It is expensive to run a deep CNN on every frame of a video. Feature estimates for a plurality of P-frames 310 or B-frames 310 are relatively resource-light and thus desired. One illustrative approach for incorporating a P-frame 310 into object detection involves, instead of requiring a heavy-duty network and recomputing the features in an I-frame 300, for the first P-frame 310 following an I-frame 300, estimating the feature map 340. The feature map 340 is estimated by bi-linearly interpolating the I-frame-derived feature vector using a motion vector which is already encoded in that I-frame's respective portion of the compressed video file. Use of the existing motion vector furthers efforts directed to reducing resource use and processing time. The feature map for the next P-frame 310 is then derived by again interpolating the previous feature map 340 using the motion vector 350 from the second P-frame 310. It should be noted that objection detection may be performed without computing or using a motion vector, but with less accuracy, by instead using the object in the previous I-frame 300. As indicated by FIG. 3, this illustrative approach applies to B-frames 310.

3. Small, Task-Specific Routine for Object Detection.

In accordance with FIG. 3, task-specific algorithms then use the extracted visual feature for the frame and a small, lightweight CNN task detector (an object detector network in this case). One option to use here is the Region-based Fully Convolutional Networks (RFCN) object detector to iteratively find the objects in the partial P-frame 310. This process is then repeated for other P-frames 310, and, with minimal loss in accuracy (on the order of three percent (3%) for a standard data set), there is a significant reduction in processing time (on the order of ten present (10%) in testing). Again, this illustrative approach additionally can be applied to B-frames 310. It should also be noted that the use here of the term "object" is for convenience, and detection of events or actions in the compressed media content is within the scope of the present disclosure.

Feature Estimation Specifics.

With regard to the specifics of GoP feature estimation referenced above, herein discussed are four illustrative algorithms to perform the P-frame 310 feature estimation based on a corresponding I-frame 300. In all the scenarios, the feature of frame $P_{k+n}$ is estimated from a GoP where its corresponding I-frame is $I_k$. Given that the length of this GoP is m, the I-frame of the next GoP is indexed as $I_{k+m}$. The feature network is denoted as $F_{cnn}(\_)$ and an RGB frame as rgb(\_). It should be noted that, while the illustrative discussion herein focuses on compressed media content frames encoded using an I-frame/P-frame/P-frame sequence of frames, other sequences (such as I-frame/P-frame/B-frame) are contemplated and certainly within the scope of the present disclosure.

An algorithm for previous I-frame 300 feature estimation in one illustrative embodiment uses the initial I-frame 300 feature as the feature for each frame in the entire GoP. Let $\hat{F}_{cnn}(rgb(P_{k+n}))$ denote the computed feature map 340 for a given P-frame 310:

$$\hat{F}_{cnn}(rgb(P_{k+n})) = F_{cnn}(rgb(I_k))$$

While efficient, this algorithm ignores the other frames and hence accuracy drops by the time the last frame in the GoP is reached. Further, accuracy drops with length of the GoP or with increases in motion.

Instead of always using the previous I-frame 300, another illustrative algorithm for nearest I-frame 300 feature estimation also considers the next I-frame 300 in the GoP and takes, from among the next and the previous I-frame 300, the nearest I-frame 300 feature map 340 as the current feature map 340. This limits the longest distance between a P-frame 310 and I-frame 300 to roughly m/2 instead of m in the previous I-frame-only approach.

$$\hat{F}_{cnn}(rgb(P_{k+n})) = \begin{cases} F_{cnn}(rgb(I_k)), & \text{if } n \leq \frac{m}{2} \\ F_{cnn}(rgb(I_{k+m})), & \text{otherwise} \end{cases}$$

To estimate the feature for frame $P_{k+n}$, a linear feature interpolation algorithm makes use of both the current I-frame 300 feature $I_k$ and the next I-frame 300 feature $I_{k+m}$, and combines them linearly:

$$\hat{F}_{cnn}(rgb(P_{k+n})) = \frac{m-n}{m} \cdot F_{cnn}(rgb(I_k)) + \frac{n}{m} \cdot F_{cnn}(rgb(I_{k+m}))$$

Finally, a motion compensated feature estimation algorithm leverages the motion vector $mv_{k+n-1,k+n}$ for estimating the GoP frame feature. For the I-frame 300 inference, again the I-frame 300 feature map 340 is computed. For inferring the P-frame 310 feature, the motion vector is utilized as an estimate of the macroblock movement and bilinear sampling is applied to sample the source frame feature for the target frame feature. This method models pixel movements between two adjacent frames and propagates the visual feature following pixel movements. This GoP feature estimation method is non-parametric and requires only a very limited amount of additional computation.

Object Detection Specifics.

As stated above, after the feature for each I-frame 300 is computed, a lightweight object detector 350 such as RFCN is executed on each P-frame 310 in order to detect the objects therein, given the I-frame 300 feature map 340 as an input. It should be noted that the same approach may be used for other tasks, such as image segmentation.

Here, a small network generates numerous "proposals" at step 250, which each include a bounding box and are essentially places in a video where an object is likely to be found in a P-frame 310. The proposal bounding box may be defined by coordinates and a height and a width. For each proposal, a check or verification (step 260) is iteratively performed to determine if the object is indeed present at that location, with the check entailing: (i) the class of the object (such as an automobile or bicycle); and (ii) regression of the location of the object, moving the bounding box around to obtain an optimal location through cross-functioning, which is the difference between the coordinates and height and width of an initial proposal bounding box and a second, improved bounding box.

A probability and location of an object are thus iteratively determined, with the output from the systems and methods potentially comprising a list of objects, object classes, probabilities, timestamps, and object locations within the particular frames, by coordinates and size. This output information can be applied to set boundaries in a given frame in order to, with confidence based on the respective probability, pinpoint the location of a given object.

A feedback or training component of the present systems and methods allows for machine learning and improved detection accuracy. In an illustrative embodiment, analyzed and run through the system is a training set of data, such as videos with one or more objects for which the class(es) and bounding box(es) are known. If the overlap between proposed and actual bounding boxes reaches a certain level or score, 0.5 for example, then the detection may be deemed correct. In the event of incorrect detection, an error signal or message is delivered to the system and further training occurs. In some embodiments, all networks put into production use for object and/or event detection from compressed media content will have gone through a training phase.

In representative embodiments for detecting compressed video objects, the systems and methods herein can be tested on the ImageNet VID object detection dataset (available at vision.cs.unc.edu/ilsvrc2015/ui/vid), where there are in the neighborhood of 3862 training videos and 555 validation videos. The frame rate is 25 fps or 30 fps for most of these video snippets. There are in total 30 object categories, as a subset of the ImageNet dataset. Using standard mean average precision (mAP) as the evaluation metric for object detection, and with the object detector pre-trained on static ImageNet objects, the accuracy of disclosed approaches on I-frame/P-frame/P-frame videos is as follows (a similar analysis can be performed on I-frame/P-frame/B-frame videos):

TABLE 1

Object Detection Results for I/P/P Videos in ImageNet VID Dataset (Using ResNet-101 as Feature Network)

| Method | Feature Network | mAP (%) |
| --- | --- | --- |
| RFCN + Previous I-frame | Pre-trained | 63.51 |
| RFCN + Nearest I-frame | Pre-trained | 67.64 |
| RFCN + Linear Interpolation | Pre-trained | 69.23 |
| RFCN + Motion Compensation | Pre-trained | 69.45 |
| RFCN + Motion Compensation | Fine-tuned/trained | 70.22 |
| Frame-wise RFCN | Fine-tuned/trained | 73.66 |
| Deep Feature Flow | Fine-tuned/trained | 72.75 |

Here, frame-wise RFCN is used as an oracle for all algorithms. While the naive Previous I-frame method fares fairly well in the testing, the Nearest I-frame method and Linear (feature) Interpolation method show increasing improvement. The Motion Compensated feature estimation algorithm further increases the accuracy, with results even better once the feature network is fine-tuned for motion compensation using GoP feature estimation end-to-end for object detection.

For comparison purposes, results from Deep Feature Flow (DFF) can also be obtained, which requires using a network to compute both the feature on I-frames and the optical flow for each frame and then estimating the features for P-frames using it. Notably DFF cannot be applied to compressed video and does not use a proposal stage for object detection, and it instead works on a pixel level with aspect ratios. As DFF requires uncompressed video to predict features, even though such a method may prove slightly more accurate, it is approximately two times (2×) slower (not including decompression time) than the techniques disclosed herein.

Testing the algorithms herein is possible on other types of video encoding, such as one comprised of I-frame/P-frame/B-frame videos and where the length of GoP extends to roughly 100 frames for all videos. In such a situation, not accounting for motion vectors of B-frames and adapting the previous frame estimation strategy to such (i.e., for B-frames, the feature from the previous non-B-frame is used), the accuracy for all approaches will drop significantly, while the general trend remains the same. There is a correlation between algorithm performance and the distance (in frames) to the next I-frame: as the distance from the previous I-frame increases, the accuracy drops correspondingly.

The computational efficiency of the disclosed paradigm compared to the frame-wise approach may be illustrated using an Amazon Web Services™ (AWS) P2 cluster (with NVIDIA® K80 GPU). As may be seen in Table 2 below, for approaches that use the future I-frame as a reference (Nearest I-frame and Linear Feature Interpolation), their detection performances first decrease and then increase. The Motion Compensation algorithm also experiences a drop in performance, but not as steeply.

Many computer vision algorithms in the art are often run on a set of sub-sampled frames. If, however, processing speed is critical, it can suffice to run the algorithms just on I-frames in a given content and linearly interpolate between them, thus providing a simple way to improve speed of existing algorithms.

TABLE 2

Inference Time Speed (P2 Cluster with NVIDIA ® K80 GPU)

| Method | Total | Feature | Detection | mAP (%) |
|---|---|---|---|---|
| Frame-wise RFCN | 0.3047s | 0.2856s | 0.0191s | 73.66 |
| DFF | 0.0730s | 0.0539s | 0.0191s | 72.75 |
| Motion + MPEG-4 I/P/P | 0.0387s | 0.0196s | 0.0191s | 70.22 |
| Motion + MPEG-4 I/P/B | 0.0205s | 0.0024s | 0.0191s | 32.88 |

For I-frame/P-frame/P-frame compressed videos and possibly I-frame/P-frame/B-frame compressed videos, the total forward time is reduced to 12.7% and 6.7% of the frame-wise detection algorithms. When only considering the feature extraction time of these two video formats, the total forward time is reduced to 6.9% and 0.84% of the frame-wise detection algorithm. DFF executes at about 14 frames/s while the presently-disclosed I-frame/P-frame/P-frame technique runs approximately 25 frames/s and is hence the fastest algorithm in the comparison. In actual practice, the video decompression time needs to be added to DFF and to the frame-wise approaches, making such approaches even slower.

Figure 4:
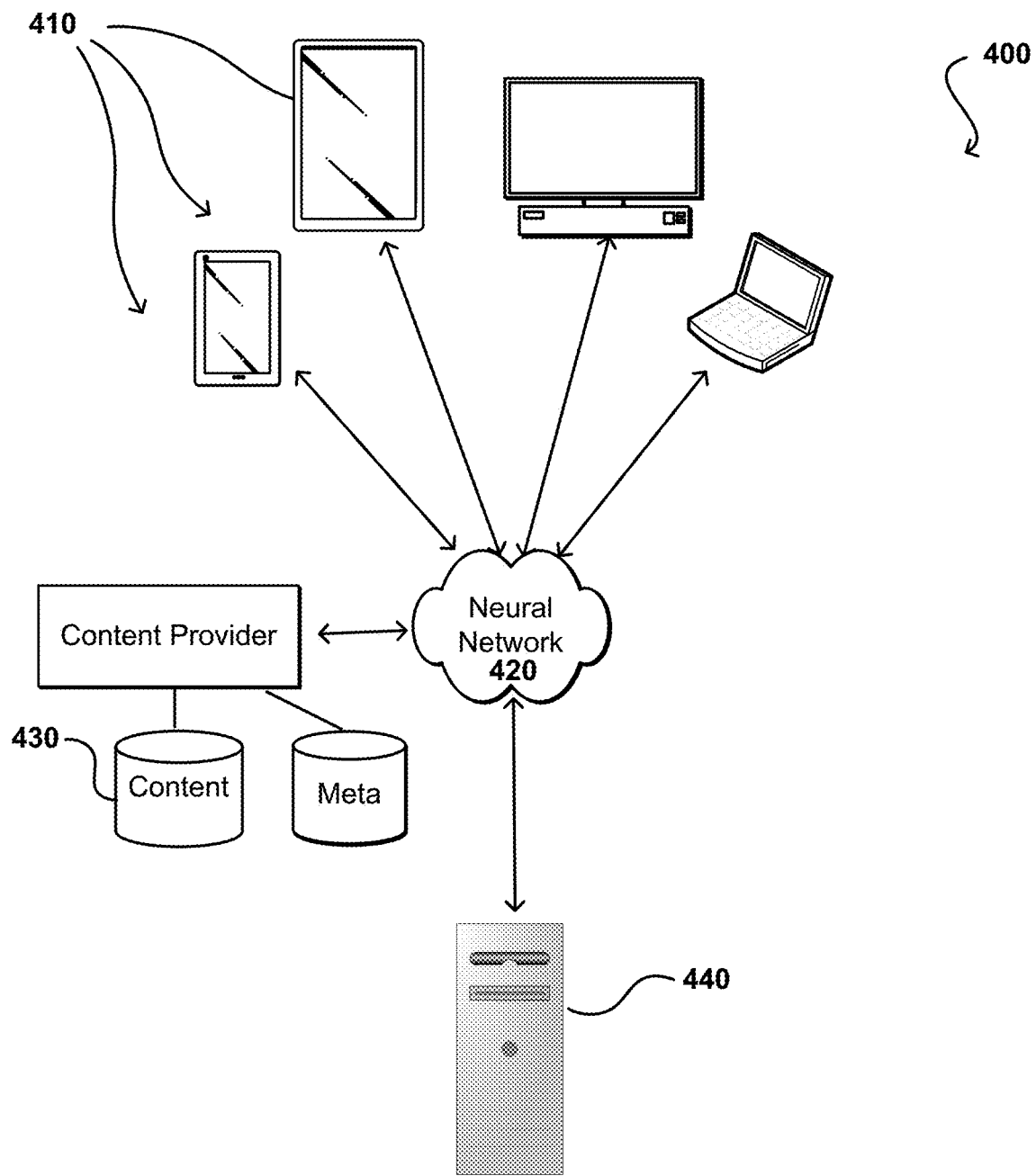
FIG. 4 illustrates an example convolutional neural network environment in which portions of the various embodiments can be implemented.

As indicated and as may be seen in FIG. 4, a CNN 420, which is a deeply-layered neural network, is employed, but a smaller network may certainly be used, with a trade-off in accuracy in some embodiments. The system environment in general is illustrated in FIG. 4 and can include a variety of content 430 database compilations, data stores, and other memory and storage media. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system 400 includes computerized devices 410, each such device 410 can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system 400 may also include one or more storage devices, such as disk drives, optical storage devices, and solid-state storage devices such as random access memory (RAM) or read-only memory (ROM), as well as removable media devices, memory cards, flash cards, etc.

Such devices 410 also can include a computer-readable storage media reader, a communications device (e.g., a modem, a network card (wireless or wired), or an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system 400 and various devices 410 also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Figure 5:
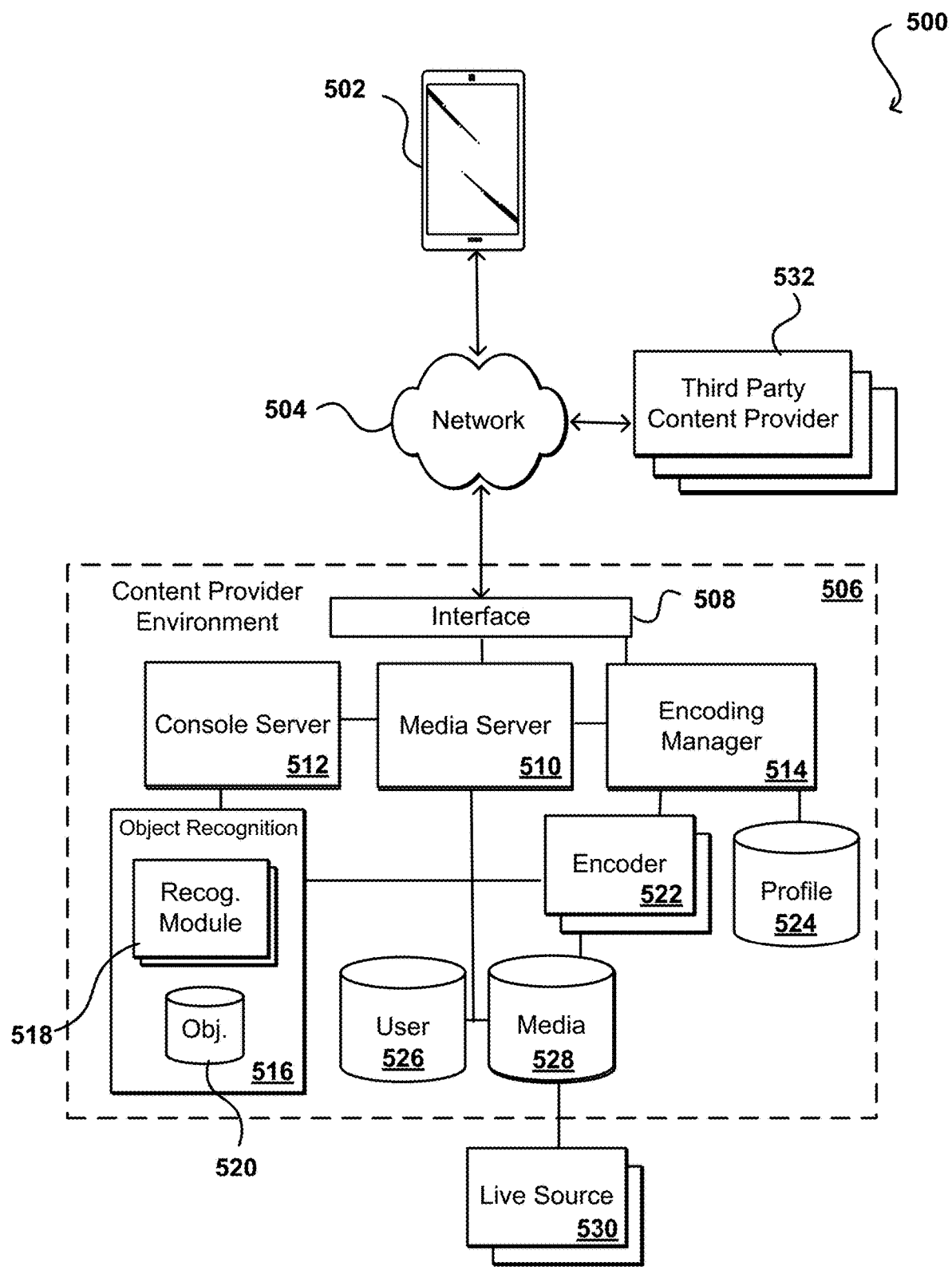
FIG. 5 illustrates an example media management service that can be utilized in accordance with various embodiments.

FIG. 5 illustrates an example content delivery system 500 in which aspects of the various embodiments can be implemented. In this example, a client computing device 502 can submit a request for content across at least one network 504 to be received by a content provider environment 506. This can include a request for specific content or a subscription to have content pushed to the client device 502, among other such options. In at least some embodiments the request can include a request for content to be displayed on, or presented via, the computing device 502, and in many cases will include video, audio, or other media content that is encoded for presentation by the client device 502. The network(s) can include any appropriate network, such as the internet, a local area network (LAN), a cellular network, an Ethernet, or other such wired and/or wireless network. The content provider environment 506 can include any appropriate resources for providing content from a resource provider, as may include various servers, data stores, and other such components known or used for providing content from across a network (or from the "cloud"). As mentioned elsewhere herein, the client computing device 502 can be any appropriate computing or processing device, as may include a desktop or notebook computer, smartphone, tablet, wearable computer (i.e., smart watch, glasses, or contacts), set top box, or other such system or device. An interface layer 508, when receiving a request or call, can determine the type of call or request and cause information to be forwarded to the appropriate component or sub-system. For example, a request for content might be forwarded to a media server 510 while a request to specify encoding parameters or generate an encoding profile might be forwarded to a encoding manager 514 or console server 512, among other such options. These calls or requests can also come from third parties, such as streaming content providers who utilize the resources of the content provider environment 506, and third party providers 532 can provide at least some of the media content to be stored to a media repository 528 and/or encoded for display on the client device 502 as discussed herein. Further, a different type of client device 502 can be used to providing encoding information than is used to consume encoded content.

In this example, a call or request received to the content provider environment 506 can be received by an interface layer 508 of the environment. As known for network environments, the interface layer can include components such as interfaces (e.g., APIs), load balancers, request and/or data routers, and the like. If the request is a request for content, such as for a video data stream to be provided to the client device 502, information for the request can be directed to one or more media servers 510, which can obtain the content from a media data store 528 or other such repository or live media source 530 (or data cache temporarily storing media from the live media source) to be sent back across the network(s) 504 to the client device 502, which can be the device submitting the request or a device identified by the request, among other such options. In some embodiments, information for the request might also be compared against user data in a user data store 526 or other such location to determine, for example, whether the user has access rights to that content, and potentially the formats or versions to which the user has access rights. In at least some embodiments a request from an operator, an administrator, a client device 502, a third party provider 532, or another such source might include a request to specify one or more sets of encoding parameters to be used with a media file. Accordingly, information regarding the encoding parameters can be provided to an encoding manager 514, or other such component or service, that is able to receive the information through an appropriate interface (i.e., an API or console) and cause the profile and parameter data to be stored to at least one appropriate repository 524 as discussed elsewhere herein. When a request for a video file is received, the encoding manager 514 can use the profile and parameter data to determine the appropriate encoding information, and can pass that to one or more encoders 522, such as may include encoding applications running on one or more allocated servers (physical or virtual), which can obtain the media file and encode the media file per the encoding information, which can then be provided to the client device by a media server 510 or other such component.

As mentioned, it may be desired in at least some embodiments to perform object, occurrence, or content determinations for one or more media files or streams received to the content provider environment 512, whether generated internally, received from a third party provider 532, or received from a live source 530, among other such options. A component such as the console server 512 cause the video feed to be analyzed provide data for representative frames to an object recognition service 516 or sub-system. The object recognition service 516 can analyze the data using one or more recognition modules 518, as may include object detection algorithms or trained neural networks, among other such options, and can compare the data in some embodiments against representations of object stored to an object data store 520. Confidence and/or probability scores can be generated for each determination in some embodiments, and a sequence of frames can be analyzed in some embodiments to improve the scores, including during the training or machine learning phase. The resulting object data, such as tags and timestamps, can then be written back to the encoder 522 for encoding in the file, or stored to the media data store 528 with the corresponding encoded media files, among other such options.

Storage media and other non-transitory computer readable media for containing primary content, supplemental content, or code, or portions of content code, can include any appropriate media known or used in the art, including storage media and communication media, such as, but not limited to, volatile and non-volatile, removable, and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device.

Figure 6:
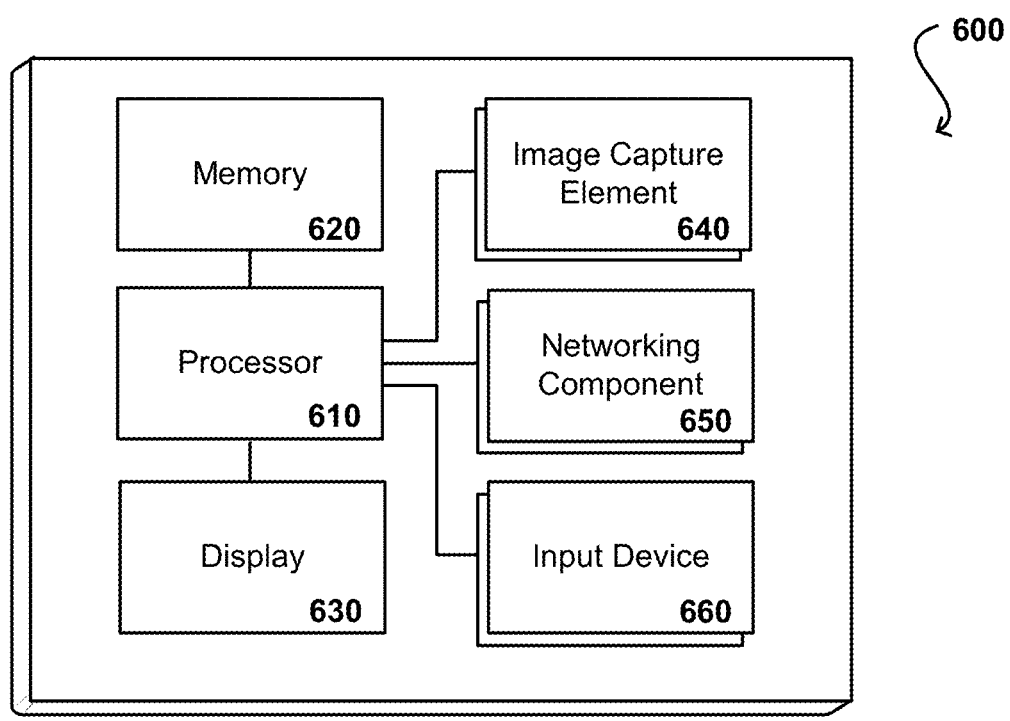
FIG. 6 illustrates components of an example computing device that can be used in accordance with various embodiments.

FIG. 6 illustrates a set of basic components of a computing device 600 that can be used to implement aspects of the various embodiments, including a client device 410 on a network 420. In this example, the device 600 includes at least one processor 610 for executing instructions that can be stored in a memory device or element 620. As would be apparent to one of ordinary skill in the art, the device can include many types of memory 620, data storage, or computer-readable media, such as a first data storage for program instructions for execution by the at least one processor 610, the same or separate storage can be used for images or data, a removable memory 620 can be available for sharing information with other devices, and any number of communication approaches can be available for sharing with other devices. The device typically will include at least one type of display element 630, such as a touch screen, electronic ink (e-ink), organic light emitting diode (OLED), or liquid crystal display (LCD), although devices such as portable media players might convey information via other means, such as through audio speakers.

The device 600 in some embodiments will include at least one video or image capture element 640, such as at least one video or image capture element 640 positioned to determine a relative position of a viewer and at least one video or image capture element 640 operable to image a user, people, or other viewable objects in the vicinity of the device 600. A video or image capture element 640 can include any appropriate technology, such as a charge-coupled device (CCD) video or image capture element 640 having a sufficient resolution, focal range, and viewable area, to capture video or an image when the user is operating the device 600. Methods for capturing images or video using an image capture element with a computing device are well known in the art and will not be discussed herein in detail. It should be understood that video or image capture can be performed using a single image, multiple images, periodic imaging, continuous image capturing, image streaming, etc. The device 600 can include at least one networking component 650 as well, and may include one or more components enabling communication across at least one network, such as the internet, a cellular network, intranet, extranet, local area network, Wi-Fi, and the like.

The device 600 can include at least one motion and/or orientation determining element, such as an accelerometer, digital compass, electronic gyroscope, or inertial sensor, which can assist in determining movement or other changes in orientation of the device. The device 600 can include at least one additional input device 660 able to receive conventional input from a user. This conventional input can include, for example, a push button, touch pad, touch screen, wheel, joystick, keyboard, mouse, trackball, keypad, or any other such device or element whereby a user can input a command to the device. These input/output (I/O) devices 660 could even be connected by a wireless infrared, Bluetooth, or other link as well in some embodiments. In some embodiments, however, such a device 600 might not include any buttons at all and might be controlled only through a combination of visual and audio commands such that a user can control the device without having to be in contact with the device.

As noted, the various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

Based on the disclosure and teachings provided herein, a person of ordinary skill in the art will appreciate other ways and/or methods to implement the various embodiments. The specification and drawings are, accordingly, to be regarded in an illustrative, rather than a restrictive, sense. It will be evident that various modifications and changes may be made thereunto without departing from the broader spirit and scope of the invention as set forth in the claims.

What is claimed is:

1. A computer-implemented method, comprising:
    obtaining compressed media content that includes a plurality of key frames and a plurality of partial frames between adjacent sets of key frames, the compressed media content further including data necessary for decompressing the key frames;
    processing, by a convolutional neural network using machine learning algorithms, the compressed media content to identify a feature map and other content information in at least one key frame;
    determining a class for a feature in the feature map;
    generating, using the feature map and the class, a proposal for an object and location thereof in at least one partial frame;
    iteratively applying one or more task-specific algorithms on an object detection network to verify the proposal with respect to the presence of the object and location thereof in the at least one partial frame; and
    generating a listing of information regarding the object in the compressed media content.

2. The computer-implemented method of claim 1, further comprising:
    executing, on top of the feature map, at least one of an action recognition module, an event recognition module, or a video segmentation module.

3. The computer-implemented method of claim 1, further comprising:
    obtaining compressed media content including two or more partial frames, the partial frames including data regarding changes to an image appearing in the at least one key frame; and
    generating a list of objects, object classes, probabilities, timestamps, and object locations within the at least one key frame and the at least one partial frame, by coordinates and size.

4. The computer-implemented method of claim 1, further comprising:
    obtaining compressed media content in the form of a training data set for machine learning prior to obtaining compressed media content for use in a production environment.

5. A computer-implemented method, comprising:
    obtaining compressed media content including at least one complete frame and at least one partial frame, the compressed media content further including data for decompressing the at least one complete frame;
    processing the compressed media content to identify a feature map in the at least one complete frame;
    determining a class for a feature in the feature map;
    generating, using the feature map and the class, a proposal for an object and location thereof in the at least one partial frame; and
    verifying the proposal with respect to the presence of the object and location thereof in the at least one partial frame.

6. The computer-implemented method of claim 5, further comprising:
    iteratively applying the feature map and one or more task-specific algorithms on an object detection network to find the object in the at least one partial frame; and
    outputting information regarding the object.

7. The computer-implemented method of claim 5, further comprising:
    obtaining compressed media content in the form of a training data set for machine learning prior to obtaining compressed media content for use in a production environment.

8. The computer-implemented method of claim 5, wherein the at least one partial frame holds only data regarding changes to an image appearing in the at least one complete frame.

9. The computer-implemented method of claim 5, further comprising:
    executing, on top of the feature map, at least one of an action recognition module, an event recognition module, or a video segmentation module.

10. The computer-implemented method of claim 5, further comprising:
    estimating a preliminary location of the object in the at least one partial frame based on a motion vector included in the compressed media content.

11. The computer-implemented method of claim 5, further comprising:
    defining, by coordinates and a height and a width, at least one bounding box for the proposal.

12. The computer-implemented method of claim 11, further comprising:
verifying, based on the at least one bounding box, the proposal with respect to the presence of the object and location thereof in the at least one partial frame.

13. The computer-implemented method of claim 5, further comprising:
obtaining compressed media content in the form of a group of pictures, wherein the at least one complete frame is an I-frame and the at least one partial frame is a P-frame.

14. A computing system, comprising:
at least one processor; and
memory including instructions that, when executed by the at least one processor, cause the computing system to:
obtain compressed media content including at least one complete frame and at least one partial frame, the compressed media content further including data for decompressing the at least one complete frame;
process the compressed media content to identify a feature map in the at least one complete frame;
determine a class for a feature in the feature map;
generate, using the feature map and the class, a proposal for an object and location thereof in the at least one partial frame; and
verify the proposal with respect to the presence of the object and location thereof in the at least one partial frame.

15. The computing system of claim 14, wherein the instructions when executed further cause the computing system to:
iteratively apply the feature map and one or more task-specific algorithms on an object detection network to find the object in the at least one partial frame; and
output information regarding the object.

16. The computing system of claim 14, wherein the instructions when executed further cause the computing system to:
obtain compressed media content in the form of a training data set for machine learning prior to obtaining compressed media content for use in a production environment.

17. The computing system of claim 14, wherein the instructions when executed further cause the computing system to:
execute, on top of the feature map, at least one of an action recognition module, an event recognition module, or a video segmentation module.

18. The computing system of claim 14, wherein the instructions when executed further cause the computing system to:
estimate a preliminary location of the object in the at least one partial frame based on a motion vector included in the compressed media content.

19. The computing system of claim 14, wherein the instructions when executed further cause the computing system to:
define, by coordinates and a height and a width, a bounding box for the proposal.

20. The computing system of claim 14, wherein the instructions when executed further cause the computing system to:
obtain compressed media content including at least one partial frame holding only data regarding changes to an image appearing in the at least one complete frame.

* * * * *